United States Patent [19]
Bald

[11] Patent Number: 5,187,992
[45] Date of Patent: Feb. 23, 1993

[54] ROTARY TO LINEAR MOTION CONVERTER

[75] Inventor: Brigitte Bald, Bad Berleburg, Fed. Rep. of Germany

[73] Assignee: Gedib Ingenieurburo Und Innovations-Beratung GmbH, Bad Berleburg, Fed. Rep. of Germany

[21] Appl. No.: 784,307

[22] Filed: Oct. 31, 1991

[30] Foreign Application Priority Data

Oct. 31, 1990 [DE] Fed. Rep. of Germany ....... 4034595

[51] Int. Cl.⁵ .............................................. F16H 27/02
[52] U.S. Cl. ............................... 74/89.15; 74/424.8 R; 74/424.8 C
[58] Field of Search ........ 74/89.15, 424.8 R, 424.8 A, 74/424.8 B, 424.8 C, 424.8 VA; 475/331, 346

[56] References Cited

U.S. PATENT DOCUMENTS

| | | | |
|---|---|---|---|
| 2,438,236 | 3/1948 | Strom | 74/424.8 A |
| 3,313,178 | 4/1967 | Saunders | 74/424.8 VA |
| 3,595,094 | 7/1971 | Lemor | 74/424.8 C X |
| 3,726,151 | 4/1973 | Lemor | 74/424.8 C X |
| 4,183,266 | 1/1980 | Osumi | 475/331 X |

FOREIGN PATENT DOCUMENTS 3937448 4/1991 Fed. Rep. of Germany .
955406 4/1964 United Kingdom .

*Primary Examiner*—Leslie A. Braun
*Assistant Examiner*—David W. Laub
*Attorney, Agent, or Firm*—Herbert Dubno; Andrew Wilford

[57] ABSTRACT

A motion converter used with an input element rotatable about an axis and an output element displaceable axially relative to the input element has an axially non-displaceable support provided with a first external screwthread of predetermined diameter, pitch, and hand centered on the axis and a second external screwthread provided on the output element centered on the axis and of the same diameter and pitch as the first screwthread but of opposite hand. A roller having respective first and second ridged portions respectively meshing with the screwthreads has a mechanical coupling for maintaining the first and second roller portions aligned axially with each other. Formations between the first and second roller portions axially couple them to each other and to the rotary input element so that on rolling of the roller portions on the screwthreads the roller portions and input element are displaced axially a predetermined distance relative to the support and the output element is displaced through twice this distance.

8 Claims, 2 Drawing Sheets

ROTARY TO LINEAR MOTION CONVERTER

FIELD OF THE INVENTION

The present invention relates to a device for converting rotational displacement into linear displacement. More particularly this invention concerns such a motion converter used to set a lathe chuck.

BACKGROUND OF THE INVENTION

In a power chuck or the like it is frequently necessary to convert a rotation into linear movement. This is done, for instance, to open or close the jaws of a chuck. Such a converter typically has coaxial input and output elements, the former being axially displaceable and the later rotatable. Rollers or the like engaged between them perform the necessary movement conversion.

German patent document 3,937,448 Hubert Bald et al uses balls as motion-converting members. Thus the rotatable elements are axially braced via these balls on an axially non-displaceable support member. Thus the support element must move both axially and rotationally.

The use of such a converter on rapidly rotating lathes creates several problems, namely:
1. To reduce throw the length and diameter must be as small as possible.
2. The converter must be able to transmit and convert considerable forces.
3. No matter what the position of the device its center of mass must not move to prevent throw and vibration.
4. Large mechanical advantage must be obtained even in a system capable of transmitting considerable force, even in a relatively small unit.

Furthermore it is necessary that the converter be of relatively simple and, therefore, inexpensive construction. In particular the screwthread guides that are essential in such a device much be designed so that they can be manufactured inexpensively.

OBJECTS OF THE INVENTION

It is therefore an object of the present invention to provide an improved rotary/linear motion converter.

Another object is the provision of such an improved rotary/linear motion converter which overcomes the above-given disadvantages, that is which can transmit considerable force at a considerable mechanical advantage, yet which is of fairly simple and inexpensive construction.

SUMMARY OF THE INVENTION

The motion converter of this invention is used with an input element rotatable about an axis and an output element displaceable axially relative to the input element. It has an axially nondisplaceable support provided with a first external screwthread of predetermined diameter, pitch, and hand centered on the axis and a second external screwthread provided on the output element centered on the axis and of the same diameter and pitch as the first screwthread but of opposite hand. A roller having respective first and second ridged portions respectively meshing with the screwthreads has a mechanical coupling for maintaining the first and second roller portions aligned axially with each other. Formations between the first and second roller portions axially couple them to each other and to the rotary input element so that on rolling of the roller portions on the screwthreads the roller portions and input element are displaced axially a predetermined distance relative to the support and the output element is displaced through twice this distance.

With the system of this invention the displacement of the output element is the sum of the displacements of the two roller portions. As the roller is forced angularly about the two screwthreads it moves axially relative to both of them. Thus the actual mechanical advantage is created in two locations, making it possible to design the unit to be fairly compact. The opposite pitches of the two screwthreads keeps the rollers aligned since one screwthread will force the roller in one direction and the other in the opposite direction, with the two forces exactly canceling each other out. Since the axial movement is created right at the roller, the need for a separate axial-thrust bearing is completely eliminated, further simplifying the device.

According to feature of the invention the roller portions are rotatable about and centered on a common roller axis parallel to but offset from the element axis. Furthermore there is a plurality of such rollers having such first and second roller portions. This keeps forces in the converter perfectly balanced. More particularly according to the invention one of the roller portions can be rotatable about the roller axis relative to the other roller portion. It is also possible for the two roller portions to be fixed unitarily together for joint rotation about the roller axis. Either way the axial connection need merely resist bending forces and axially couple the first and second roller portions. A cage or the like can be provided for maintaining the rollers in an array angularly equispaced about the element axis.

Furthermore according to the invention each of the roller portions is formed with a set of annular circular ridges and grooves of 0° pitch. Similarly the input element is formed with internal annular ridges and grooves meshing with and complementary to the grooves and ridges of the portions. Such formations are relatively easy to machine to great accuracy, and can transmit great force when relatively square-sided.

In accordance with further feature of this invention each roller is formed with an external toothing and the input element is formed with an internal toothing meshing with the external toothing. In addition each roller is formed with an external toothing and the output element is formed with an internal toothing meshing with the external toothing.

The motion converter according to this invention can further have a second input element separate from the first-mentioned input element and displaceable along the axis and another linear/rotary motion converter connected between the input elements for converting axial displacement of the second input element into angular displacement of the first input element. This second converter can be of the simple steep-screwthread type and can serve to convert a coarse axial movement of a setting device into a fine axial movement in the chuck being controlled.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
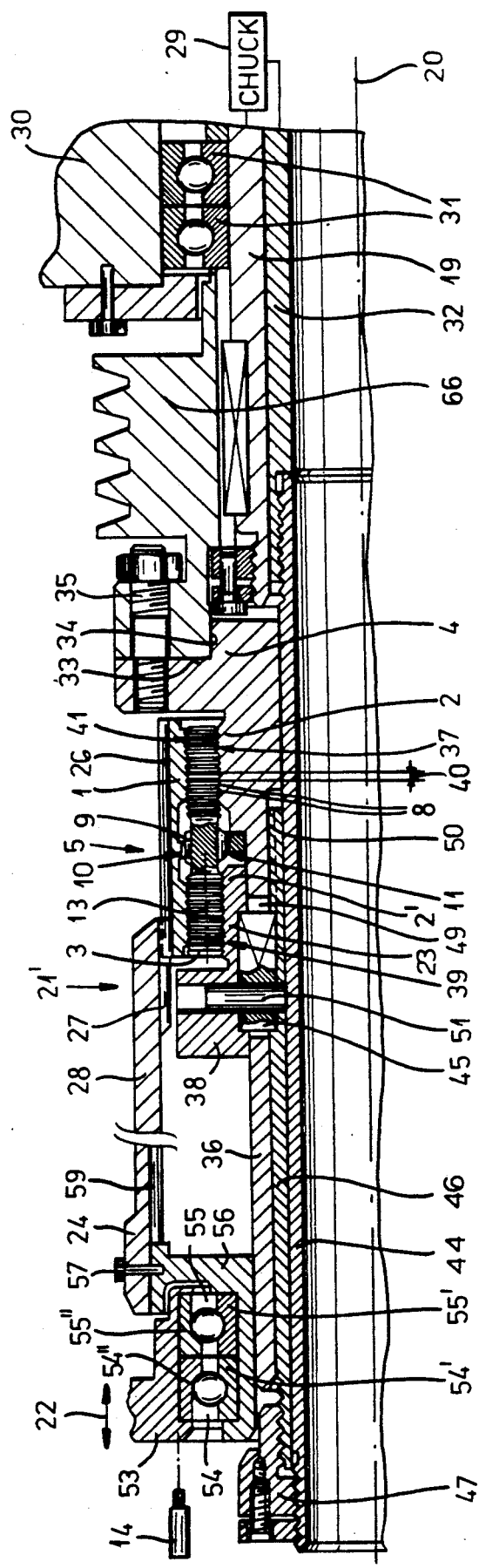
FIG. 1 is an axial section through a motion converter according to the invention in one end position.
Figure 2:
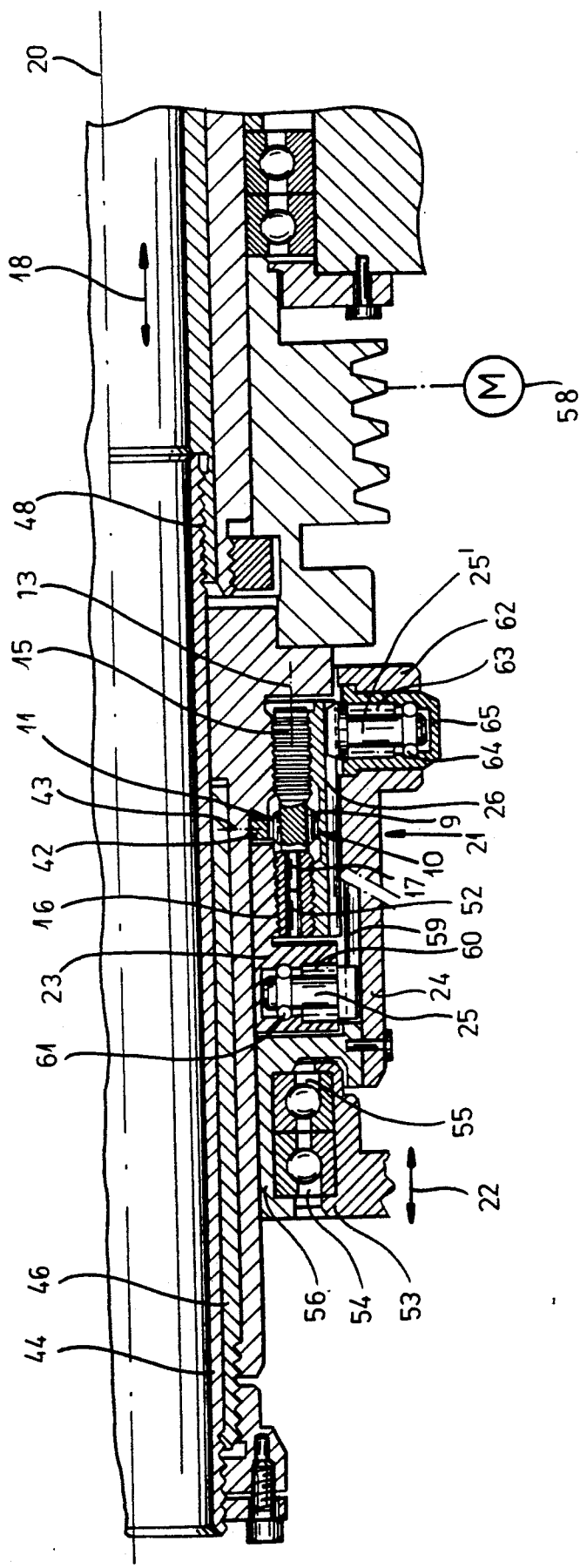
FIG. 2 is a similar section through another converter in the opposite end position.

As seen in FIGS. 1 and 2 the device according to this invention is intended for connection between a schematically illustrated chuck 29, a schematically illustrated motor 58 that rotates the chuck 29 about an axis 20, and a schematically illustrated actuator 14 that opens and closes the unillustrated jaws of the chuck 29. As is known per se the motor 58 rotates the chuck 29 while it is holding a workpiece during a machining operation and the actuator 14 operates to open and close the chuck 29 to release and clamp the unillustrated workpiece.

The chuck 29 itself is carried on a tubular shaft or rod 19 centered on the axis 20 and supported by roller bearings 31 in a stationary housing 30. Coaxially inside this shaft 19 is an adjustment or actuator rod or tube 32 that serves as an output element and is shifted axially as indicated at 18 by the actuator 14 through a stroke h equal here to about 3 mm to open and close the unillustrated chuck jaws. A multiple V-belt pulley 66 splined to the shaft 19 is connected via unillustrated V-belts to the motor 58.

This pulley 66 has an outer (left-hand in the drawing) end face 33 formed with an axially centered hole 34 to which a support or input element 4 of a roller-type motion converter 5 is secured by bolts 35. This support 4 is centered on the axis 20 and is extended outward as an axially centered cylindrical support sleeve 36. An inner ring 56 carries inner races 54' and 55' of axial-thrust bearings 54 and 55 whose outer races 54" and 55" are held in an input member 53 that can move axially as indicated at 22 through a stroke H equal here to about 60 mm by the actuator 14. This member 53 does not rotate about the axis 20. The ring 56 not only rotates with the rest of the elements, but can move axially along the extension sleeve 36. Another sleeve 24 centered on the axis 20 is secured as indicated at 57 to the ring 56 and extends inward therefrom. This sleeve 24 can have an inner end 28 formed as an actuator 21' as shown in FIG. 1 or an inner end 62 formed as an actuator 21 as seen in FIG. 2 and described in more detail below.

The converter 5 basically comprises an inner part 2 formed integrally with the support element 4 and having an external multiple screwthread 37, an outer part 2' formed on a push ring 23 and having an outer end 38 formed with a screwthread 39 identical to the screwthread 37 but of opposite hand, connecting rollers 3, and a connecting sleeve 1. The push ring 23 can slide axially on the sleeve 36 but is connected via segmental keys 45 to a connecting sleeve 46 received between the sleeve 36 and another connecting sleeve 44 having an inner end fastened at a screwthread 48 to the actuating tube 32. The other ends of the sleeves 44 and 46 are fixed together by an adapter and adjustment ring 47. The segments 45 pass through respective radially throughgoing apertures 49 formed in the sleeve 36 and are not only recessed in radially inwardly and outwardly open seats in the elements 23 and 44, but also are secured in place by pins 51. A bayonet formation 50 eases mounting of the sleeve 46. The apertures 49 are axially considerably longer than the respective segments 45, but receive them with little or no angular play to ensure good angular coupling of the elements 32 and 36. Thus the part 2 is axially and angularly fixed to the actuator tube 32.

As seen in FIG. 1 each roller 3 has two ends formed with identical annular square-sided ridges 8 that mesh complementarily with the screwthreads 37 and 39. There are a plurality of such rollers 3 held in an unillustrated cage so as to be angularly equispaced about the axis 20. These screwthreads 37 and 39 are a multiple N of a single thread of very shallow pitch 40, N here being equal to 18. In addition the connecting sleeve 1 is formed with annular internal grooves 41 of 0° pitch like the ridges 8 and that are also of basically square section to mesh complementarily therewith. The center of each roller 3 is formed as a gear with external teeth 9 that mesh outwardly with an internal toothing 10 of the sleeve 1 and internally with a toothing 11 of a ring gear 42 fixed as indicated in FIG. 2 at 43 to the support 4. The spacing between adjacent ridges 8 is here equal to about 2 mm and the pitch of the screwthreads 37 and 39 is such that with 27° of rotation of the element 1 the rollers 3 move through an axial stroke equal to h/2 or 1.5 mm and the outer element 2' moves through a distance equal to h or 3.0 mm. Meanwhile of course there is no relative axial movement between the element 1 and the rollers 3.

FIG. 1 further shows how the element 1 itself is formed with external screwthread ridges 26 that mesh with internal ridges 27 of the inner end 28 of the sleeve 24. Thus axial movement of the sleeve 24 through its stroke H rotates the sleeve 1 through 27° to displace the element 2' through 3 mm. This is therefore a 20:1 mechanical advantage. The use of the angled screwthread formations 26 and 27 leaves some friction in the connection so that no reverse driving of the sleeve 24 is possible, that is axial movement of the sleeve 24 can rotate the sleeve 1 in the appropriate direction, but torque applied to the sleeve 1 cannot normally axially displace the sleeve 24. The result is that the actuator 14 can be relaxed once the chuck 29 is set to spare the bearings 54 and 55.

In FIG. 2 the illustrated roller 3 has two end parts 15 and 16 that can rotate relative to each other about an axis 13 parallel to the axis 20. This is possible because the part 15, which is formed with the gear 9, has a pin 17 received in a central bore 52 of the part 16. In addition in this figure the inner end 62 is provided with a sleeve 65 in which a pin 25' is mounted via a needle bearing 63 and a roller bearing 64. The inner end of this pin 25' rides in the respective groove 26. Furthermore the segments 45 are not present in FIG. 2, but the sleeve 24 is rotationally coupled to the element 23 by a plurality of pins 25 each seated in a needle bearing 60 and roller bearing 61 and sliding in an axial groove 59 formed in the sleeve 24. Thus the connection between the sleeve 24 and the push ring 23 and between the end 62 and the element 1 has very low friction.

I claim:
1. In combination with
an input element rotatable about an element axis, and
an output element displaceable axially relative to the input element, a rotary/linear motion converter comprising:
an axially nondisplaceable support provided with a first external screwthread of predetermined diameter, pitch, and hand centered on the axis;
a second external screwthread provided on the output element centered on the axis and of the same diameter and pitch as the first screwthread but of opposite hand;

a roller having respective first and second ridged portions respectively meshing with the screwthreads;

means including a mechanical coupling between the first and second roller portions for maintaining the roller portions aligned axially with each other; and formations between the first and second roller portions axially coupling them to each other and to the rotary input element, whereby on rolling of the roller portions on the screwthreads the roller portions and input element are displaced axially a predetermined distance relative to the support and the output element is displaced through twice this distance.

2. The rotary/linear motion converter defined in claim 1 wherein the roller portions are rotatable about and centered on a common roller axis parallel to but offset from the element axis.

3. The rotary/linear motion converter defined in claim 2 wherein the two roller portions are fixed unitarily together for joint rotation about the roller axis.

4. The rotary/linear motion converter defined in claim 2 wherein one of the roller portions is rotatable about the roller axis relative to the other roller portion.

5. The rotary/linear motion converter defined in claim 2 wherein each roller is formed with an external toothing and the formations include a sleeve formed with an internal toothing meshing with the external toothing.

6. The rotary/linear motion converter defined in claim 2 wherein each roller is formed with an external toothing and the output element is formed with an internal toothing meshing with the external toothing.

7. The rotary/linear motion converter defined in claim 1 wherein each of the roller portions is formed with a set of annular circular ridges and grooves of 0° pitch.

8. The rotary/linear motion converter defined in claim 7 wherein the formations include a sleeve formed with internal annular ridges and grooves meshing with and complementary to the grooves and ridges of the portions.

* * * * *